(12) United States Patent
He et al.

(10) Patent No.: US 8,857,511 B1
(45) Date of Patent: Oct. 14, 2014

(54) METHOD AND APPARATUS FOR RESTORING CONTAMINATED GROUNDWATER

(71) Applicant: North China Electric Power University, Beijing (CN)

(72) Inventors: Li He, Beijing (CN); Jing Shen, Beijing (CN); Jiaqi Zhang, Beijing (CN); Zhentong Li, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 14/254,855

(22) Filed: Apr. 16, 2014

(30) Foreign Application Priority Data

Jul. 5, 2013 (CN) .......................... 2013 1 0281890

(51) Int. Cl.
  *E21B 43/40* (2006.01)
  *E21B 49/08* (2006.01)
  *C02F 1/00* (2006.01)

(52) U.S. Cl.
  CPC ..................................... *E21B 43/40* (2013.01)
  USPC ................... 166/266; 166/75.12; 166/250.01; 166/268; 166/275; 166/305.1; 166/310

(58) Field of Classification Search
  None
  See application file for complete search history.

(56) References Cited

U.S. PATENT DOCUMENTS

| | | | |
|---|---|---|---|
| 6,431,281 B1 * | 8/2002 | McNab et al. ................ | 166/279 |
| 2002/0011442 A1 * | 1/2002 | McMurtrey et al. .......... | 210/634 |
| 2003/0150799 A1 * | 8/2003 | Salanitro et al. .............. | 210/610 |
| 2009/0142137 A1 * | 6/2009 | Michailuck et al. ........ | 405/128.7 |

FOREIGN PATENT DOCUMENTS

| | | |
|---|---|---|
| CN | 102774965 A | 11/2012 |
| JP | 2004130184 A | 4/2004 |

OTHER PUBLICATIONS

First Office Action in OEE CN Patent Application No. 201310281890.3, mailed Dec. 4, 2013.
Second Office Action indicating allowance in OEE CN Patent Application No. 201310281890.3, mailed Jan. 26, 2014.
Water Supply Engineering, Edition 4, Dec. 1999, by Xushi Yan, China Architecture and Building Press, Beijing, China.

* cited by examiner

*Primary Examiner* — Zakiya W Bates
(74) *Attorney, Agent, or Firm* — Syncoda LLC; Feng Ma

(57) ABSTRACT

Apparatus and method are provided to restore contaminated groundwater based on in-situ periodic pumping and recharging. The apparatus includes a contaminated groundwater suction system, an in-situ restoration system, and a reinjection system. The suction system includes a suction well and a suction pipeline. The suction system is connected with the in-situ restoration system. The in-situ restoration system is connected with the reinjection system. The reinjection system includes a reinjection pipeline and a reinjection well. Prior to the in-situ restoration, a pumping test for suction well and an injection test for reinjection well are conducted. Through reinjecting the processed contaminated groundwater, this approach is capable of diluting contaminated water layer, reducing the pollutant concentration in the target aquifer, providing convenience for the subsequent processing, and cutting the cost. The timely recharging of processed groundwater can effectively prevent negative consequences caused by deficiency of the groundwater.

1 Claim, 2 Drawing Sheets

METHOD AND APPARATUS FOR RESTORING CONTAMINATED GROUNDWATER

CROSS-REFERENCE TO RELATED APPLICATIONS

The present application is a continuation of, and claims priority to, Chinese Patent Application No. 201310281890.3 filed Jul. 5, 2013, the disclosure of which is hereby incorporated by reference in its entirety.

BACKGROUND

Groundwater is an important part of the water resources. With the rapid development of urbanization, groundwater pollution problems are increasingly prominent. As an important source for human drinking and farm irrigation, groundwater can highly affect human health and crop quality, and is thus urgent to be protected and properly processed. In most cases, the contaminated groundwater needs to be pumped out to the earth surface before its treatment and restoration. However, this approach may cause decrease of groundwater level, formation of groundwater funnels in the confined aquifer, and subsidence of ground surface. A groundwater remediation approach, capable of decontaminating groundwater, imposing little effect on groundwater level, and avoiding the groundwater funnel and surface subsidence, is thus needed.

SUMMARY

This invention may be applied to restoring contaminated groundwater with an approach that is based on in-situ periodic pumping and recharging. In order to avoid the defects of existing remediation technology, the invention aims at providing an approach for restoring contaminated groundwater based on in-situ periodic pumping and recharging.

This invention discloses a periodic in-situ pumping and recharging apparatus for restoring contaminated groundwater, which comprises a suction system for contaminated groundwater, an in-situ restoration system and a reinjection system. The suction system comprises one or more suction wells and their corresponding suction pipelines. The suction system is connected with the in-situ restoration system and the in-situ restoration system is connected with the reinjection system. The reinjection system comprises one or more reinjection wells and their corresponding reinjection pipelines.

In the above-mentioned suction system, the suction well is built underground. A sleeve tube is built in a concrete grout layer, and a diameter reducing tube is installed at the bottom of the sleeve tube. Below the sleeve tube is a gravel pack which is installed in the target aquifer. The end of the sleeve tube is connected with the diameter reducing tube and the concrete grout layer. A screen is installed between the gravel pack and the target aquifer. Some drill holes are set on the screen. The suction pipeline runs through the soil into the sleeve tube. The bottom of the suction pipeline is connected with the diameter reducing tube, and the top of the suction pipeline is connected with the in-situ restoration system. A deep water pump is installed at the bottom of the suction pipeline.

In the above-mentioned reinjection system, the recharging well is installed underground. The locations and connections of the recharging well and corresponding sleeve tube, concrete grout layer, diameter reducing tube, gravel pack, screen, and drill holes thereof, are the same as the locations and connections of the suction well and corresponding sleeve tube, concrete grout layer, diameter reducing tube, gravel pack, screen, and drill holes thereof. The posterior segment of the recharging pipeline runs through the soil into the sleeve tube, and the anterior segment of the recharging pipelines is connected with the posterior segment of the recharging pipelines through a U-shaped pipe. The bottom of the posterior segment of recharging pipelines is connected with the diameter reducing tube. The other end of the anterior segment of the recharging pipeline is connected with the in-situ restoration system. A deep water pump is installed at the bottom of the posterior segment of the recharging pipeline.

A valve corresponding to the suction pipelines and a valve corresponding to the recharging pipeline are each respectively installed in the suction pipeline and the recharging pipeline at two sides of the in-situ restoration system. Between the ground surface and the valve corresponding to the suction pipelines, the suction pipeline is connected with a water sampling and detection device, a pressure gauge and a pitometer. Between the in-situ restoration system and the valve corresponding to the recharging pipeline, the recharging pipeline is connected with a water sampling and detection device. Between the valve corresponding to the recharging pipeline and the U-shaped pipe, the recharging pipeline is connected with a pressure gauge and a pitometer. A controller is connected with the deep water pump and the valve corresponding to the suction pipeline, and with the deep water pump and the valve corresponding to the recharging pipeline respectively through power shafts.

A method using the above mentioned periodic in-situ pumping and recharging device, the method comprising:

1) performing a pumping test and a recharging test, wherein the pumping test and recharging test meet the following requirements: pumping steadily lasts for at least 12 h; the water yield is greater than the expected water yield; the water level drop is less than 5 m; recharging steadily lasts more than 36 h; the recharging quantity is greater than the expected recharging quantity.

2) pumping the contaminated groundwater into the suction system. The deep water pump in the suction pipeline begins to work and the valve is opened. After the contaminated groundwater is pumped to the ground by the pumping system from the target aquifer, it enters the in-situ restoration system. The suction system may continuously work 12-24 h before the controller stops the deep water pump in the suction pipeline, and the valve is closed;

3) pumping the contaminated groundwater into the in-situ restoration system. The contaminated groundwater is treated in the in-situ restoration system, and the restoration period is 24-48 h;

4) pumping the treated water into the recharging system. The controller opens the valve on the recharging pipeline, and the deepwater pump drives the treated groundwater to recharge back to the aquifer. In the process of recharging, the treated groundwater can dilute the polluted groundwater and reduce the pollutant concentration in the target aquifer. The recharging period is 12-24 h, and after that the controller stops the deep water pump in the recharging pipeline and the valve is closed;

5) if the recharging system stops, the controller signals the deep water pump in the suction pipeline to start working, and the valve is opened, and the Steps 1) through 4) are repeated; and 6) if the water sampling in the suction pipeline satisfies the Water Quality Standard for Drinking Water Sources (CJ3020-1993)-level 2, the device stops running and the remediation is finished.

Beneficial effects of the invention include:

1) the apparatus has a compact structure, and operates conveniently and reliably; 2) the processed groundwater is recharged back to the aquifer, which can dilute the polluted groundwater, reducing the pollutant concentration in the target aquifer, and providing further convenience for the subsequent processing and reducing the remediation cost; 3) The timely recharging of processed groundwater can effectively prevent the negative consequences caused by deficiency of the groundwater; 4) the device has high flexibility and wide application area, because the number of pumping and recharging wells, and the restoration periods as well, can be customized depending on different hydrogeological conditions; 5) it does not generate secondary pollution, and is environment-friendly.

Figure 1:
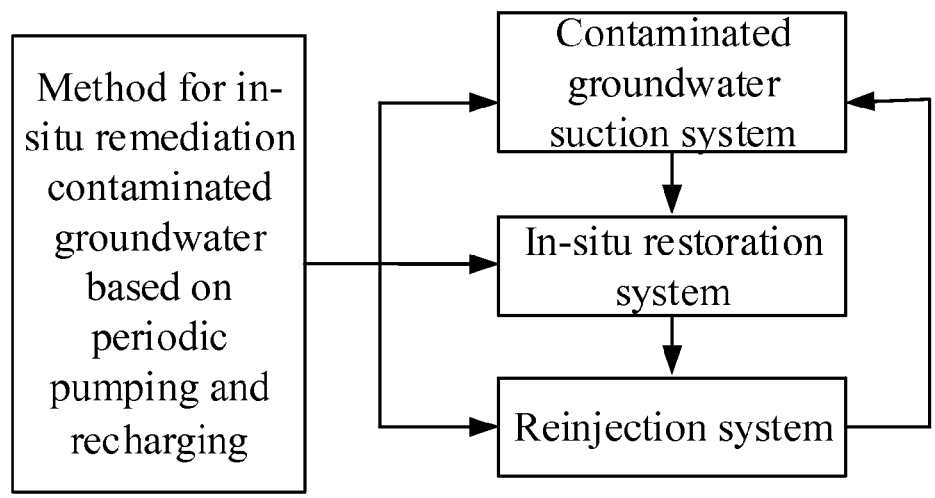
FIG. 1 is a schematic diagram of the apparatus for in-situ remediation contaminated groundwater based on periodic pumping and recharging.
Figure 2:
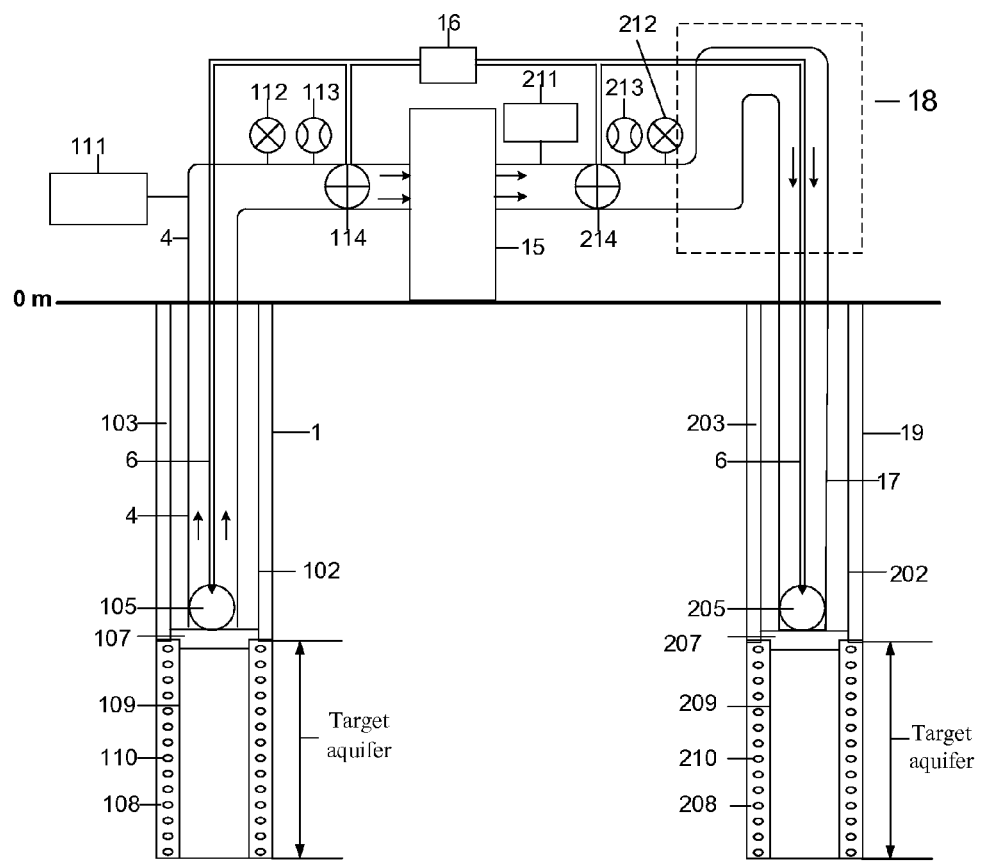
FIG. 2 is the device structure diagram of a first embodiment.

Numerals in the drawings represent: 1-suction well, 102, 202-sleeve tube, 103, 203-concrete grout layer, 4-suction pipeline, 105, 205-deep water pump, 6-power shaft, 107, 207-diameter reducing pipe, 108, 208-gravel pack, 109, 209-screen, 110, 210-drill hole, 111, 211-water sampling and detection device, 112, 212-pressure gauge, 113, 213-pitometer, 114, 214-valve, 15-in-situ restoration system, 16-controller, 17-recharing pipeline, 18-U-shaped pipe, and 19-recharging well.

DETAILED DESCRIPTION

The invention aims at providing an approach for restoring groundwater contamination based on in-situ periodic pumping and recharging. The invention is further explained combining with figures and one embodiment.

Embodiment 1

A periodic in-situ pumping and recharging apparatus for restoring contaminated groundwater, which comprises a suction system for the contaminated groundwater, an in-situ restoration system and a reinjection system. The suction system comprises one or more suction wells and their corresponding suction pipelines, and the suction system is connected with the in-situ restoration system and the in-situ restoration system is connected with the reinjection system. The reinjection system comprises one or more reinjection wells and their corresponding reinjection pipelines.

In the above-mentioned suction system, the suction well 1 is built underground. A sleeve tube 102 is built in a concrete grout layer 103, and a diameter reducing tube 107 is installed at the bottom of the sleeve tube 102. Below the sleeve tube 102 is a gravel pack 108 which is built in the target aquifer. The end of the sleeve tube 102 is connected with the diameter reducing tube 107 and the concrete grout layer 103. A screen 109 is installed between the gravel pack 108 and the target aquifer. Some drill holes 110 are set on the screen 109. The suction pipeline 4 runs through the soil into the sleeve tube 102. The bottom of the suction pipeline 4 is connected with the diameter reducing tube 107, and the top of the suction pipeline 4 is connected with the in-situ restoration system 15. A deep water pump is installed at the bottom of the suction pipeline 4.

In the above-mentioned reinjection system, the recharging well 19 is built underground. The locations and connections of the recharging well 19 and its corresponding sleeve tube 202, concrete grout layer 203, diameter reducing tube 207, gravel pack 208, screen 209, and drill holes 210 are comparable to the locations and connections of the suction well 1 and its corresponding sleeve tube 102, concrete grout layer 103, diameter reducing tube 107, gravel pack 108, screen 109, and drill holes 110. The posterior segment of the recharging pipeline 17 runs through the soil into the sleeve tube 202, and the anterior segment of recharging pipeline 17 is connected with the posterior segment of the recharging pipeline 17 through a U-shaped pipe 18. The bottom of the posterior segment of the recharging pipeline 17 is connected with the diameter reducing tube 207. The other end of the anterior segment of the recharging pipeline 17 is connected with the in-situ restoration system 15. A deep water pump 205 is installed at the bottom of the posterior segment of the recharging pipeline 17.

A valve 114 corresponding to the suction pipeline 4 and a valve 214 corresponding to the recharging pipeline 17 are each respectively installed in the suction pipeline and the recharging pipeline at two sides of the in-situ restoration system 15. Between the ground surface and the valve 114, the suction pipeline 4, is connected with a water sampling and detection device 111, a pressure gauge 112, and a pitometer 113. Between the in-situ restoration system 15 and the valve 214, the recharging pipeline 17 is connected with a water sampling and detection device 211. Between the valve 214 corresponding to the recharging pipeline 17 and the U-shaped pipe 18, the recharging pipeline 17 is connected with a pressure gauge 212 and a pitometer 213. A controller 16 is connected with the deep water pump 105 and the valve 114 corresponding to the suction pipeline 4, and with the deep water pump 205 and the valve 214 corresponding to the recharging pipeline 17 respectively through power shafts 6.

An embodiment of a method for in-situ restoring contaminated groundwater using the above mentioned periodic in-situ pumping and recharging device, the method comprising:

1) performing a pumping test and a recharging test, wherein the pumping test and recharging test meet the following requirements of: pumping steadily lasting for at least 12 h; water yield greater than the expected water yield; water level dropping less than 5 m; recharging steadily lasting more than 36 h; and recharging quantity greater than the expected recharging quantity;

2) pumping the contaminated groundwater into the suction system. Under the control of the controller, the deep water pump in the suction pipeline begins to work and the valve is opened. After the contaminated groundwater is pumped to the ground by the pumping system from the target aquifer, it enters the in-situ restoration system. The suction system may continuously work 12-24 h before the controller stops the deep water pump in the suction pipeline, and the valve is closed.

3) pumping the contaminated groundwater into the in-situ restoration system. The contaminated groundwater is treated in the in-situ restoration system, and the restoration period is 24-48 h.

4) pumping the treated water into the recharging system. The controller opens the valve on the recharging pipeline, and the deepwater pump drives the treated groundwater to recharge back to the aquifer. In the process of recharging, the treated groundwater can dilute the polluted groundwater and reduce the pollutant concentration in the target aquifer. The recharging period is 12-24 h, and after that the controller stops the deep water pump in the recharging pipeline and the valve is closed;

5) if the recharging system stops, the controller signals the deep water pump in the suction pipeline to start working, and the valve is opened, and the Steps 1) through 4) are repeated; and 6) if the water sampling in the suction pipeline satisfies the Water Quality Standard for Drinking Water Sources (CJ3020-1993)-level 2, the device stops running and the remediation is finished.

The invention claimed is:

1. A method for restoring contaminated groundwater using a periodic in-situ pumping and reinjection apparatus, the apparatus comprising: a suction system, an in-situ restoration system, and a reinjection system, wherein: the suction system comprises one or more suction wells and corresponding suction pipelines; the suction system is connected with the in-situ restoration system; the in-situ restoration system is connected with the reinjection system; the reinjection system comprises one or more reinjection wells and corresponding reinjection pipelines;

wherein in the suction system, the suction well is built underground; a sleeve tube is built in a concrete grout layer; a diameter reducing tube is installed at the bottom of the sleeve tube, a gravel pack is set in a target aquifer below the sleeve tube, the end of the sleeve tube is connected with the diameter reducing tube and the concrete grout layer; a screen is installed between the gravel pack and the target aquifer; some drill holes are set on the screen; the suction pipeline runs through the soil into the sleeve tube; the bottom of the suction pipeline is connected with the diameter reducing tube; the top of the suction pipeline is connected with the in-situ restoration system; a deep water pump is installed at the bottom of the suction pipeline;

wherein in the reinjection system, the reinjection well is installed underground; the locations and connections of the reinjection well and corresponding sleeve tube, concrete grout layer, diameter reducing tube, gravel pack, screen and drill holes whereof, are comparable to the locations and connections of the suction well and corresponding sleeve tube, concrete grout layer, diameter reducing tube, gravel pack, screen and drill holes whereof; the posterior segment of the reinjection pipeline runs through the soil into the sleeve tube, and the anterior segment of the reinjection pipelines is connected with the posterior segment of the reinjection pipeline through a U-shaped pipe; the bottom of the posterior segment of the reinjection pipeline is connected with the diameter reducing tube; the other end of the anterior segment of the reinjection pipeline is connected with the in-situ restoration system; a deep water pump is installed at the bottom of the posterior segment of the reinjection pipeline;

wherein at two sides of the in-situ restoration system the suction pipeline and the recharging reinjection pipeline are connected wherewith, and a valve corresponding to the suction pipelines and a valve corresponding to the reinjection pipeline are each respectively installed in the suction pipeline and the reinjection pipeline; between a ground surface and the valve corresponding to the suction pipelines, the suction pipeline is connected with a water sampling and detection device A, a pressure gauge A and a pitometer A; between the in-situ restoration system and the valve corresponding to the reinjection pipeline, the reinjection pipeline is connected with a water sampling and detection device B; between the valve corresponding to the reinjection pipeline and the U-shaped pipe, the reinjection pipeline is connected with a pressure gauge B and a pitometer B; a controller is connected with the deep water pump and the valve corresponding to the suction pipeline, and with the deep water pump and the valve corresponding to the reinjection pipeline respectively through power shafts;

wherein the method comprises specific steps including:

(1) performing a pumping test and a reinjection test, wherein the pumping test and reinjection test meet the requirements of: pumping steadily lasting for at least 12 h; water yield greater than the expected water yield; water level dropping less than 5 m; reinjection steadily lasting more than 36 h; and reinjection quantity greater than the expected reinjection quantity;

(2) pumping contaminated groundwater into the suction system, in which process under the control of the controller the deep water pump in the suction pipeline begins to work and the valve is opened; and the contaminated groundwater is pumped from the target aquifer to the ground surface by the deep water pump in the suction pipeline, and enters the in-situ restoration system; the suction system continuously works 12-24 h depending on an amount of the contaminated groundwater, the controller stops the deep water pump in the suction pipeline, and the valve is closed;

(3) pumping the contaminated groundwater into the in-situ restoration system, in which process the contaminated groundwater is pumped through the suction pipeline to the ground and enters the in-situ restoration system and is treated wherein; and the restoration period is 24-48 h;

(4) pumping the treated water into the reinjection system, in which process the controller opens the valve on the reinjection pipeline, and the deep water pump drives the treated water to recharge back to the target aquifer; in the process of reinjection, the treated groundwater dilutes the polluted groundwater and reduces the pollutant concentration in the target aquifer; the reinjection period is 12-24 h, the controller stops the deep water pump in the reinjection pipeline and the valve is closed;

(5) the controller signaling the deep water pump in the suction pipeline to start working when the reinjection system stops, in which process the valve corresponding to the suction pipeline is opened, and Steps (1) through (4) are repeated; and (6) the reinjection apparatus stops running when the water sample taken from the water sampling and detection device A in the suction pipeline satisfies a selected water quality standard for drinking water sources.

* * * * *